Patented Oct. 16, 1928.

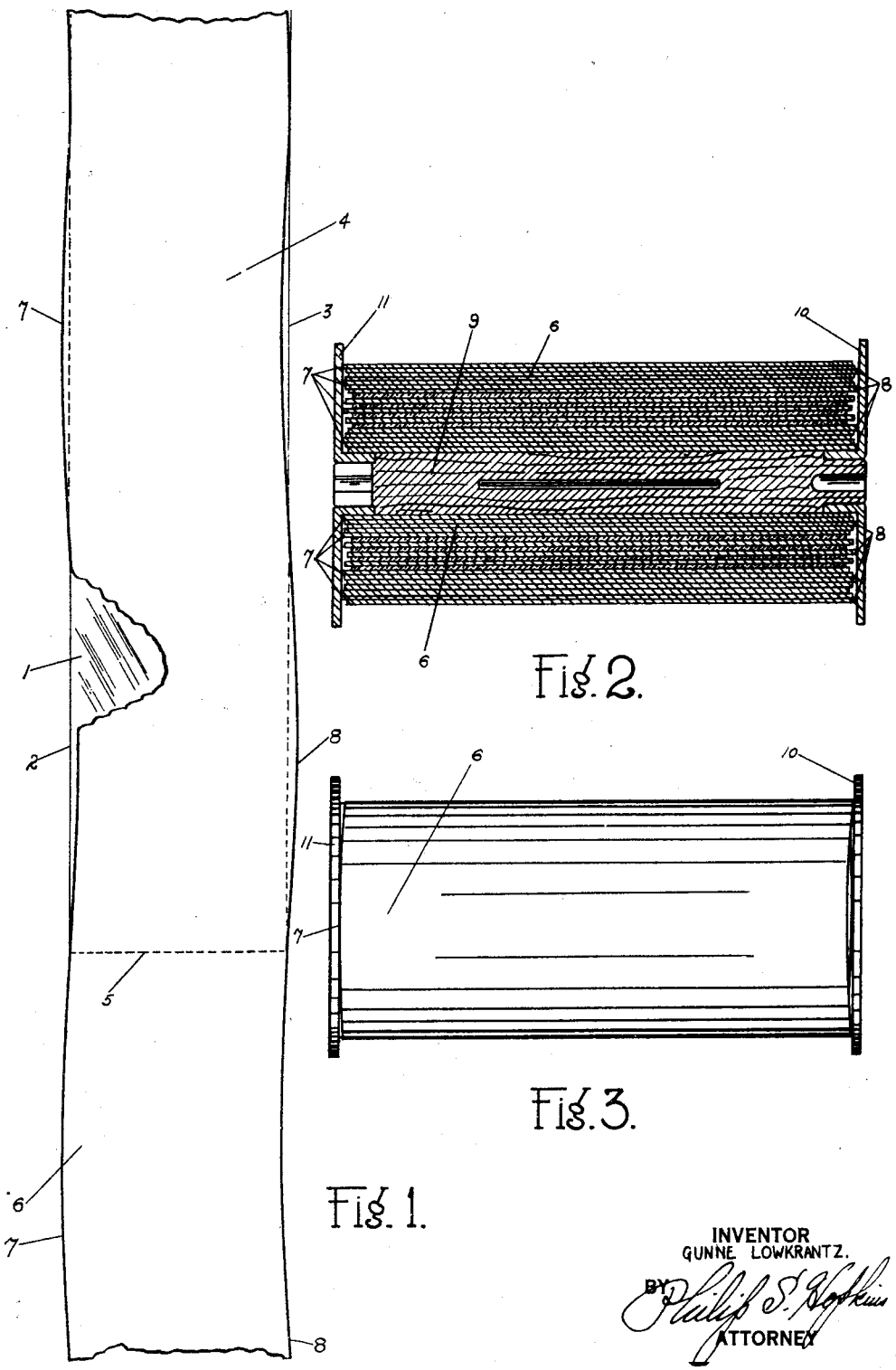

1,688,050

UNITED STATES PATENT OFFICE.

GUNNE LOWKRANTZ, OF BINGHAMTON, NEW YORK, ASSIGNOR TO ANSCO PHOTO-PRODUCTS, INC., OF BINGHAMTON, NEW YORK.

EDGE-FOG PREVENTIVE FOR PHOTOGRAPHIC-FILM STRIPS.

Application filed February 18, 1927. Serial No. 169,377.

My invention pertains to photographic film cartridges and particularly to that type normally used in amateur hand cameras wherein there is wound upon a spool a strip of film with which is interwound a protective paper covering of greater length than the film strip whereby a leader strip is provided at each end of the film for the purpose of "daylight loading".

Ordinarily this paper strip is slightly wider than the film, the purpose being to thus protect the edges of the film from becoming light struck or fogged by the light leaking in along the inner surfaces of the spool flanges between which the strips are wound. This has proven only partially effective due to the fact that frequently the paper covering shrinks when dried, the flanges get slightly out of alignment, or the paper and film may not be spooled accurately. I am aware that attempts have been made to overcome this objection by undulating or folding over the edges of the protective paper covering and in other ways, none of which have proven practical in commercial use.

By my invention, I have provided an edge fog preventive which in actual use has proven satisfactory and effective. I accomplish this purpose by forming the protective paper strip in a serpentine or sinuous shape longitudinally, such formation serving to alternately close the space between the inner faces of the flanges on either side of the strips at all points about the circumference of the roll.

Other objects and advantages by way of detail will be apparent as the description proceeds, reference being had to the accompanying drawing wherein like reference numerals indicate like parts.

In the drawing:—

Figure 1 is a plan view of a section of film and protective strip illustrating my invention.

Figure 2 is a cross sectional view of a photographic film cartridge provided with my invention.

Figure 3 is a plan view of the same.

The reference numeral 1 refers to a strip of photographic film of usual form having the straight parallel sides 2 and 3. The protective paper strip is indicated at 4 and as shown is serpentine in form or longitudinally irregular. This protective strip 4 may be slightly wider than the film strip 1 although with my construction it need not necessarily be so, as shown in Figure 1. The film 1 is secured to the protective strip 4 intermediate the ends of the latter as at 5 and the strip 4 extends beyond such end of the film to form the leader strip 6. It will be understood that a similar leader strip extends beyond both ends of the film strip. The entire length of the protective strip 4, including the leader strips 6, is formed longitudinally irregular, the side edges thereof alternately crossing the vertical planes defined by the straight edges of the film. In the case of the protective strip 4 being wider than the film strip, the irregular edges of the strip 4 may not cross such planes but will nevertheless be irregular as indicated in Figure 1.

The side edges of the protective strip 4 are preferably parallel although in some instances this may not be necessary. The points of irregularity, as for instance the "high points" 7 on one side of the strip 4 and the "high points" 8 on the opposite side thereof may be uniformly spaced apart or such spacing may be also irregular, depending upon the length of the strip used and the diameter of the roll to be formed.

The result of this construction is that as the roll or cartridge is built up by winding upon the spool 9 between the flanges 10 and 11, one of the leader strips 6 is first wound about the spool and then the film and paper covering are interwound thereon, and lastly the outer leader strip 6 is wound about the complete roll.

In so winding, it will be observed particularly with reference to Figure 2 that the irregular paper covering and leader strips alternately engage the inner face of the side flanges 10 and 11 to prevent the passage of light past them. The "high points" 7 and 8 overlying the next adjacent edge of film or protective paper at all points about the roll.

It will thus be seen that I have provided a light tight film cartridge by means of a longitudinally irregular protective paper covering which likewise provides the leader strips, also irregular or serpentine in shape. Of course, changes may be made by way of detail without departing from the spirit and scope of my invention. I do not limit myself, therefore, to the exact form shown other than by the appended claims.

I claim:—

1. In combination with a strip of photographic film, a protective strip therefor, the edges of said protective strip at points intersecting the edges of said film strip.

2. In combination with a straight strip of photographic film, a protective strip therefor, the edges of said protective strip being parallel and serpentine in shape.

3. In combination with a photographic film strip, a protective strip therefor, the ends of said protective strip extending beyond the ends of said film strip, and said protective strip at points throughout its length intersecting the vertical planes of the edges of said film strip.

4. In combination with a photographic film strip, a protective strip therefor, the ends of said protective strip being extended to form leader strips, and the edges of said protective strip being parallel and at points intersecting the vertical planes of the edges of said film strip.

5. A photographic film cartridge comprising a spool and flanges thereon, a strip of photographic film and a protective strip therefor interwound on said spool between said flanges, said protective strip being longitudinally irregular whereby the edges thereof alternately engage the inner faces of said flanges.

6. A photographic film cartridge comprising a spool and flanges thereon, a strip of photographic film and a protective strip therefor interwound on said spool between said flanges, said protective strip being longitudinally irregular whereby the edges thereof alternately engage the inner faces of said flanges, said protective strip being longer than said film strip to provide leader strips and said irregularity continuing through such leader strips.

GUNNE LOWKRANTZ.